H. P. THOMPSON.
PRESSURE RESPONSIVE DEVICE.
APPLICATION FILED FEB. 28, 1910.
977,486.
Patented Dec. 6, 1910.
2 SHEETS—SHEET 1.
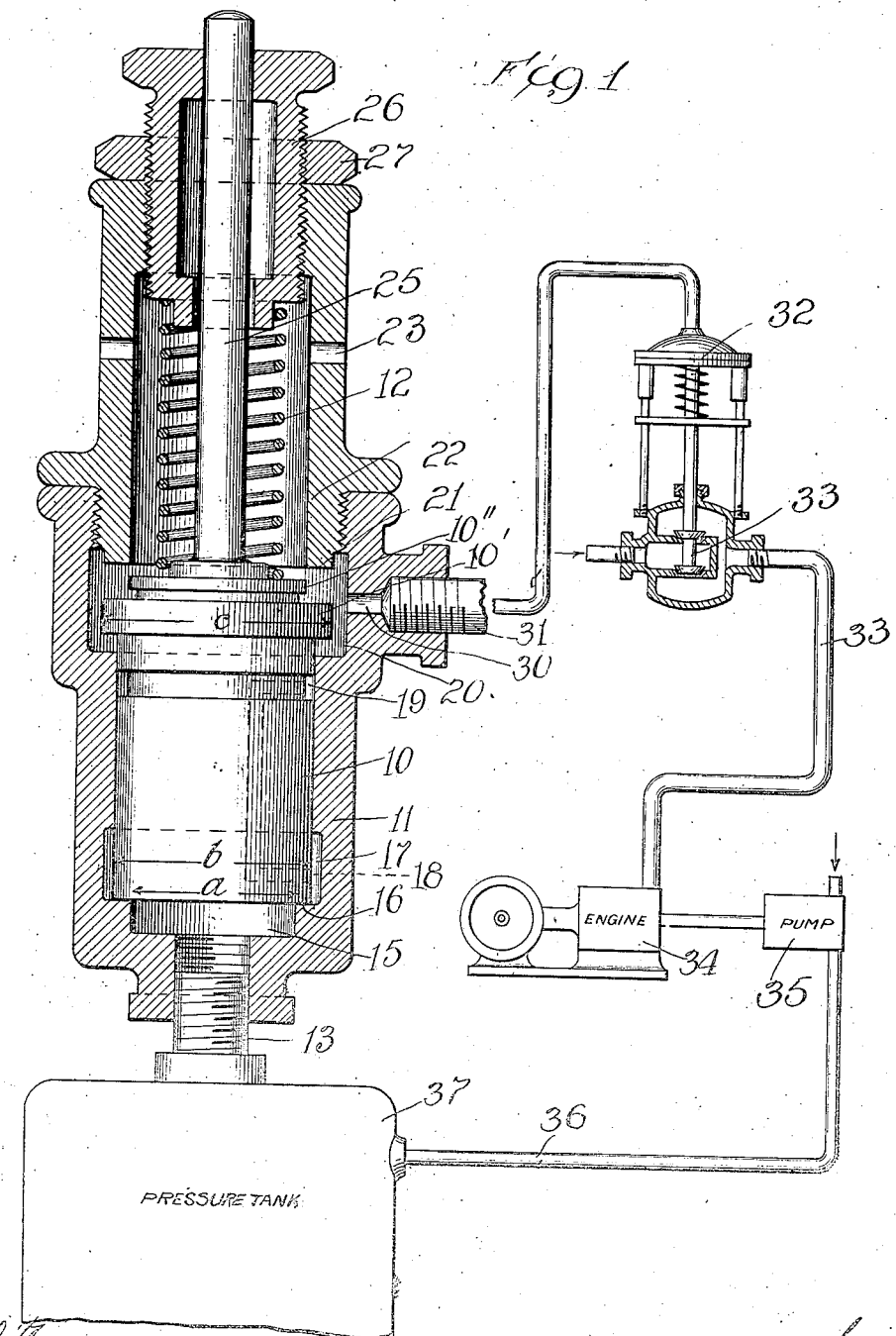

H. P. THOMPSON.
PRESSURE RESPONSIVE DEVICE.
APPLICATION FILED FEB. 28, 1910.
977,486.
Patented Dec. 6, 1910.
2 SHEETS—SHEET 2.
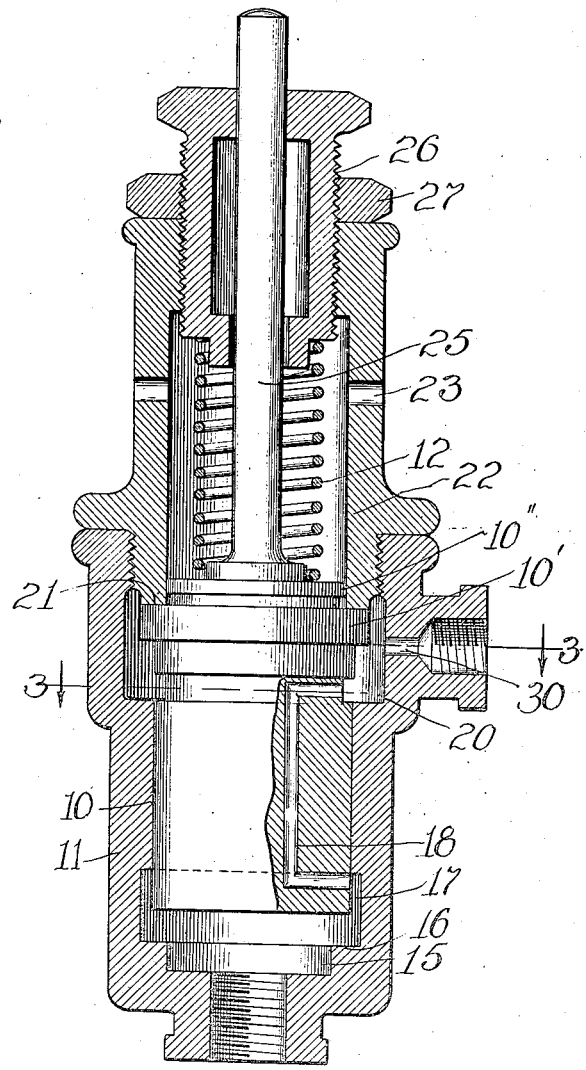
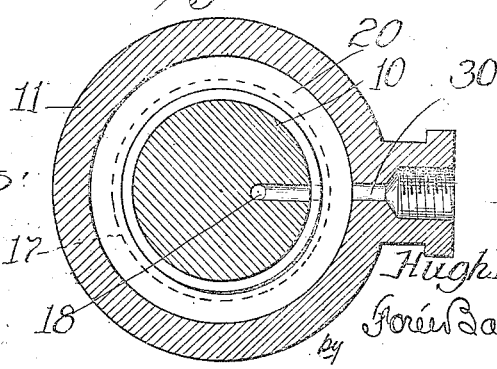

UNITED STATES PATENT OFFICE.

HUGH PERRONET THOMPSON, OF CHICAGO, ILLINOIS.

PRESSURE-RESPONSIVE DEVICE.

977,486.  Specification of Letters Patent.  Patented Dec. 6, 1910.

Application filed February 28, 1910. Serial No. 546,460.

*To all whom it may concern:*

Be it known that I, HUGH PERRONET THOMPSON, a subject of the King of England, residing at Chicago, in the county of Cook and State of Illinois, have invented certain new and useful Improvements in Pressure-Responsive Devices, of which the following is a specification.

My invention relates to improvements in pressure-responsive devices, and has for its object to provide a device responsive to variations in the pressure of some prescribed area, operable to effect positive, complete excursions of a moving part under predetermined high and low critical degrees, respectively, of the pressure in such area, which I will herein term the controlling or prime pressure, the variations of which are to be utilized.

In many environments it is desirable that pressure conditions in some prescribed area may not exceed a given maximum, or fall below a given minimum, and my invention provides a responsive device so appositely and positively operable at the predetermined critical limits of the variable controlling pressure in some prescribed area that the action easily may be utilized to govern other mechanisms, such, for instance, as the mechanisms by which pressure is admitted to or engendered in the prescribed area in which the pressure variation is to be limited.

In its broad aspect, my invention contemplates the provision of a pressure movable element, acted upon in one direction by a suitable determinate force, preferably applied by a power element, such as a spring, and acted upon, in the other direction by the variable controlling pressure, in arrangement such that the effective area of said movable element exposed to the controlling pressure increases as the element moves away from the power dominated position under the influence of the maximum controlling pressure, whereby said element may effect a positive and complete excursion to its terminal "pressure-dominated position;" and conversely, the exposed area decreases as the element moves from pressure-dominated position back toward power-dominated position under the influence of a drop of the prime pressure to a determined minimum value.

In the drawings, Figure 1 represents an embodiment of my invention shown in vertical cross-section with the moving parts in "power-dominated" position, supplemented with a diagrammatic representation of coöperating parts illustrative of one useful application of my invention; Fig. 2 is a vertical cross section with the parts in pressure-dominated position; and Fig. 3 is a section on line 3—3 of Fig. 2.

Specifically, 10 indicates a plunger arranged in a shell or cylinder, 11, and acted on in one direction by a substantially constant or arbitrary force, preferably that applied by a spring, 12, as a power element, and acted on in the opposite direction by a variable fluid pressure, which I may term the controlling pressure, supplied from a suitable prescribed area, as a pipe, 13.

When the variable pressure is at or below minimum desired value, the plunger 10 stands as indicated in Fig. 1, at one extreme of its stroke, or as I will term it distinctively, in "power-dominated" position, while at or above the desired maximum value of the variable controlling pressure, said plunger stands at the opposite extreme of its stroke, as shown in Fig. 2, or in "pressure-dominated" position.

The essential arrangement which I provide is such that the effective area which the plunger exposes to the variable controlling pressure, when it is in power-dominated position is less than that when in travel from said position to the other or pressure dominated position, the area exposed by the plunger to the controlling pressure when in dominated position being greater than that which it exposes in travel back to its first said extreme position.

Specifically, the casing body, 11, provides a chamber, 15, surrounded by a horizontal shoulder, 16, on which the flat bottom of the plunger may seat when the latter is in power-dominated position, so exposing to the variable pressure of pipe 13 only a primary area of diameter "*a*." But, obviously, as soon as the plunger is lifted ever so little, the secondary area of diameter "*b*" is exposed to the variable controlling pressure, and so when the variable controlling pressure becomes so great that working on area "*a*" it overcomes the spring opposition slightly, the sudden increase in exposed effective area of the plunger from the area "*a*" to the area "*b*" enables the plunger to be forced positively and completely to its opposite limit of movement. (See Fig. 2.) In rising, the plunger opens chamber 15 to a lateral channel, 17, in the casing just above seat 16, with which said channel constantly communicates through duct, 18, (Fig. 2) extending through the plunger to a channel 19 of the plunger, adapted and arranged to clear the edge of the upper or head chamber, 20, of the casing somewhat before the upper limit of movement of the plunger is reached.

The head chamber, 20, provides at its upper end an annular horizontal seat, 21, preferably formed on a cylindrical bonnet, 22, screwed into the unitary body of the casing; and within the head chamber the plunger is provided with a head or enlargement, 10', of diameter "$c$," adapted to seat on the part 21. If desired, a superposed extension, 10'', adapted to fit snugly into the spring cylinder, 22, may be provided on the plunger, and arranged to effect its entrance into said cylinder, 22, just as channel 19 of the plunger begins to clear the edge of the head chamber. Obviously, as the plunger completes its upper stroke, the controlling pressure is communicated through duct, 18, and channel, 19, to head chamber 20, so that when head 10' seats against seat 21, and the tertiary area "$c$" is effectively exposed to the variable controlling pressure, maintenance of the plunger in its raised or pressure-dominated position is insured until the controlling pressure falls appreciably below the critical high pressure point at which its action on primary area "$a$" was sufficient to dominate the opposed spring pressure. When, however, the controlling pressure drops to a minimum critical value at which, acting on area "$c$" it is no longer able to balance the "power" or spring pressure the spring 12 unseats head, 10', from seat 21. Instantly, the pressures on opposite sides of the head enlargement 10' balance, so leaving effectively exposed to the controlling pressure only the secondary area, "$b$"; and accordingly the plunger makes a positive, complete, quick stroke back to power-dominated position, thereby seating the plunger on shoulder or seat, 16, and reducing the effective area to the primary area "$a$."

The extension 10'' serves merely to prevent momentary free escape of fluid under pressure from pipe 13 to atmosphere by the channel 17, duct 18, head chamber 20, and opening 23 in the spring housing, while the plunger is in transit, but practically this refinement may be omitted as the movements of the plunger are small and its velocity and momentum sufficient to make such leakage slight and negligible.

Structurally the apparatus described is simple. The casing body may be made as a unit, and the casing bonnet, screwed thereonto.

The plunger, 10, may have a stem, 25, integrally or otherwise connected thereto to be guided in a cap, 26, adjustably mounted in the bonnet, 22, to act as an abutment for the spring, 12, surrounding stem 25, and said cap may be locked in adjusted position by a nut 27. For applying power to the work in hand, obviously, the stem 25 might be suitably utilized, or the variation in pressure in head chamber, 20, may be employed, said chamber being subject under one condition to atmospheric pressure, and under the other condition to the pressure of pipe 13. Also, obviously, the work of the device might be utilized anywhere where it might be desired to govern operations of other mechanisms to conform with maximum and minimum critical pressures in the prescribed area.

In the single exemplification of a practical utilization of my invention shown in Fig. 1, I provide a port, 30, opening to head chamber 20, communicating through pipe, 31, with diaphragm chamber, 32, controlling a balanced steam valve, 33, of the supply pipe for engine, 34, operating a pump, 35, which supplies fluid under pressure by pipe, 36, to pressure tank, 37, communicating with pipe 13. These parts are, of course, only diagrammatically shown. Under the conditions shown in Fig. 1, the balanced valve is open, the engine and pump are in operation, and the controlling pressure is increasing. Say at 55 lbs., for example, the pressure on area "$a$" overcomes the spring 12, and slightly lifts the plunger off its lower seat. Instantly, such pressure, acting now on secondary area "$b$", snaps the plunger to its opposite limit of movement or pressure-dominated position, and further holds it there by application of such pressure on tertiary area "$c$". This controlling pressure communicated to the head chamber and through the port 30 to the diaphragm chamber 32 actuates the diaphragm to close valve 33, the engine and pump stop and the controlling pressure is restricted to this maximum critical valve. Assume, now, that controlling pressure becomes reduced in the tank to say 50 lbs., as a desired minimum. Spring 12, overcomes 50 lbs. pressure on area "$c$" and at once the effective area exposed to the minimum controlling pressure is reduced to the secondary area "$b$", and therefore the plunger snaps back to initial power-dominated position. This cuts head chamber 20 off from communication with pipe 13, and opens the said head chamber to atmospheric pressure through apertures 23. The diaphragm, 32, ceases to act, as the pressure thereon is reduced to atmospheric pressure, valve 33 springs open, engine, 34, and pump, 35, start up, and the pressure rise toward maximum is begun again.

While I have herein described a simple and effective structure which I have found in practice to be effective and satisfactory, it will be apparent that changes might be made in the specific construction without departure from the spirit of my invention and within the scope of the appended claims.

What I claim is:

1. In a pressure-responsive device, a casing, a movable element therein, exposed to a variable controlling pressure for movement thereby in one direction and to a determinate force acting in the opposite direction for movement thereby in said direction, said element being arranged to expose to the controlling pressure when in its transit from one extreme position to the other an area greater than that which it exposes when in one limit of movement and less than that which it exposes when at its other limit.

2. In a pressure-responsive device, a casing a movable element therein exposed to a variable pressure for movement in one direction and to a determinate force acting in the opposite direction for movement thereby in said direction, said element being arranged to expose to the variable pressure when at one extreme of movement an effective area less than that which it exposes in the course of its transit toward the other extreme of movement, and conversely to expose to the pressure when at its second extreme of movement an effective area greater than that which it exposes to said pressure in the course of its transit back toward said extreme of movement.

3. In a pressure-responsive device, a casing, a reciprocating plunger therein and a power device tending to move the plunger in one direction, there being an opening for communication with a source of controlling pressure to oppose the power device at one end of the casing, said casing providing seats for the plunger at opposite extremes of its range of movement, and the plunger and casing being arranged so that the area exposed by the plunger to the controlling pressure in its transit from one extreme of movement to the other is less than the area exposed to said pressure when at one extreme of movement and greater than the area exposed to said pressure when the plunger is at its other extreme of movement.

4. In a pressure-responsive device, the combination of a casing providing a main chamber and a head chamber, a plunger having a cylinder portion in the main chamber and a head portion in the head chamber, said casing providing reduced seat for the plunger at its lower extreme of movement and a seat for the head at its upper extreme of movement, an adjustable spring for operation in conjunction with said plunger tending to force it to its lower extreme of movement, there being a controlling pressure inlet at the end of the casing opposing the spring and passages for communication from said controlling pressure inlet to the head chamber when the plunger is at its upper extreme of movement, whereby the plunger exposes a minimum area to pressure when in its lowest position, a maximum area to the pressure when in its upper position, and an intermediate area to the pressure when in transit between the two extremes.

5. In a device of the character described, the combination of a casing providing a body having a lower area of one diameter, an intermediate area of a second diameter, and a head chamber of largest diameter, and a detachable upper bonnet providing a guide, a plunger in the casing structure providing a stem guided by said bonnet, a spring between the bonnet and the plunger providing a head within the head chamber, and said casing providing upper and lower seats for the plunger, such that the area of the plunger exposed to the lowest chamber is less than that exposed to the intermediate chamber when the plunger is in transit, and that the head area exposed to the head chamber when the plunger is at its upper limit of movement is greater than the area which is exposed when the plunger is in transit, there being in the casing and plunger structure passages for communicating pressure from the lower chamber to the head chamber when the plunger is in its uppermost position, whereby in the transit of the plunger from lowest to highest position the exposed area of the plunger may increase, and with reverse movement of the plunger the exposed area thereof may decrease.

6. In a device of the character described, a casing providing a lower area of one diameter, an intermediate area of a greater diameter, and an head chamber of greatest area, a plunger for movement within said casing arranged when in its lower position to expose a minimum effective area to pressure, when in transit from lowest position to expose an intermediate effective area to pressure, and when in its uppermost position to expose a greatest effective area to pressure, adjustable means for resisting movement of the plunger from lowest to uppermost position normally maintaining the plunger in lowest position with minimum area of pressure exposed, there being a controlling pressure inlet to the lower area of the casing, passages for pressure communication from said controlling pressure inlet to the head chamber open when the plunger is in uppermost position, and an outlet from the head chamber opened to the controlling pressure from the controlling pressure inlet when the plunger is in pressure-dominated position.

In testimony whereof I hereunto set my hand in the presence of two witnesses.

HUGH PERRONET THOMPSON.

In the presence of—
W. LINN ALLEN,
MARY F. ALLEN.